US009804414B1

(12) United States Patent
Chen

(10) Patent No.: US 9,804,414 B1
(45) Date of Patent: Oct. 31, 2017

(54) EYEGLASS STRUCTURE

(71) Applicant: ASWAN INTERNATIONAL CORP., Taipei (TW)

(72) Inventor: Yung-An Chen, Taipei (TW)

(73) Assignee: ASWAN INTERNATIONAL CORP., Taipei (TW)

( * ) Notice: Subject to any disclaimer, the term of this patent is extended or adjusted under 35 U.S.C. 154(b) by 0 days.

(21) Appl. No.: 15/229,520

(22) Filed: Aug. 5, 2016

(51) Int. Cl.
*G02C 5/22* (2006.01)
*G02C 1/02* (2006.01)

(52) U.S. Cl.
CPC ............. *G02C 5/2209* (2013.01); *G02C 1/02* (2013.01)

(58) Field of Classification Search
CPC .......... G02C 5/143; G02C 5/22; G02C 3/003; G02C 3/006; G02C 9/02
USPC .................... 351/116, 110, 111, 153; 16/228
See application file for complete search history.

(56) References Cited

U.S. PATENT DOCUMENTS 6,641,265 B1* 11/2003 Hou ......................... G02C 5/10
351/110
8,944,591 B2* 2/2015 Li ........................... G02C 3/003
16/228

* cited by examiner

*Primary Examiner* — Hung Dang
(74) *Attorney, Agent, or Firm* — Li & Cai Intellectual Property (USA) Office

(57) ABSTRACT

An eyeglass structure is provided, including a lens and a pair of temples. Two ends of the lens are respectively disposed with a pair of connecting parts and a position limiting part, wherein the position limiting part and the pair of connecting parts are disposed at intervals. Each connecting part has a pivot hole, and the position limiting part has a concave part. One end of each of temple is disposed with a pair of connecting arms, and a space is formed between the pair of connecting arms. One side of each connecting arm is pivotally connected to the pivot hole, and the pair of the connecting arms are respectively received in the spaces. A part of the pair of connecting arms of each temple selectively moves to the concave part, thereby separating the pair of connecting arms from the pair of connecting parts.

10 Claims, 12 Drawing Sheets

EYEGLASS STRUCTURE

BACKGROUND

1. Technical Field

The present disclosure relates to an eyeglass structure, in particular, to an eyeglass structure of which the pair of temples are easily detachable.

2. Description of Related Art

Generally, the pair of temples of an eyeglass structure are correspondingly fixed to the eyeglass structure by means of screws. However, it is hard to detach the temples from the eyeglass structure without using specific tools, which makes it difficult to replace the lens and the temples.

SUMMARY

An exemplary embodiment of the present disclosure provides an eyeglass structure to resolve the aforementioned shortcomings with respect to the difficulty in replacing a lens or temples of an eyeglass structure without using specific tools.

According to one exemplary embodiment of the present disclosure, an eyeglass structure is provided, including a lens and a pair of temples. Two side surfaces of the lens are respectively defined as an internal side surface and an external side surface. Two ends of the internal side surface of the lens are respectively disposed with a pair of connecting parts and a position limiting part, wherein the position limiting part and the pair of connecting parts are disposed at intervals. Each of the connecting parts is disposed with a pivot hole, and each of the position limiting parts is disposed a concave part. The pair of temples are respectively pivotally connected to one end of the lens, and a space is formed between the pair of the connecting arms, wherein a pair of the protrusion portion disposed on the pair of the connecting arms are opposite to each other. The pair of the connecting arms are respectively received in spaces between the position limiting part and the pair of the connecting parts, and at least one part of the position limiting part is selectively received in the space between the pair of the connecting arms; and wherein a part of the pair of connecting arms disposed on each of the temples selectively moves to the concave part, enabling the pair of connecting arms to separate from the pair of the connecting parts.

To sum up, the user can press the external sides of the pair of connecting arms disposed on one of the temples to enable the pair of connecting arms to move to the concave part, thereby separating the pair of connecting arms from the pair of connecting parts, so as to allow the user to detach the lens from the temple without using the specific tools.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
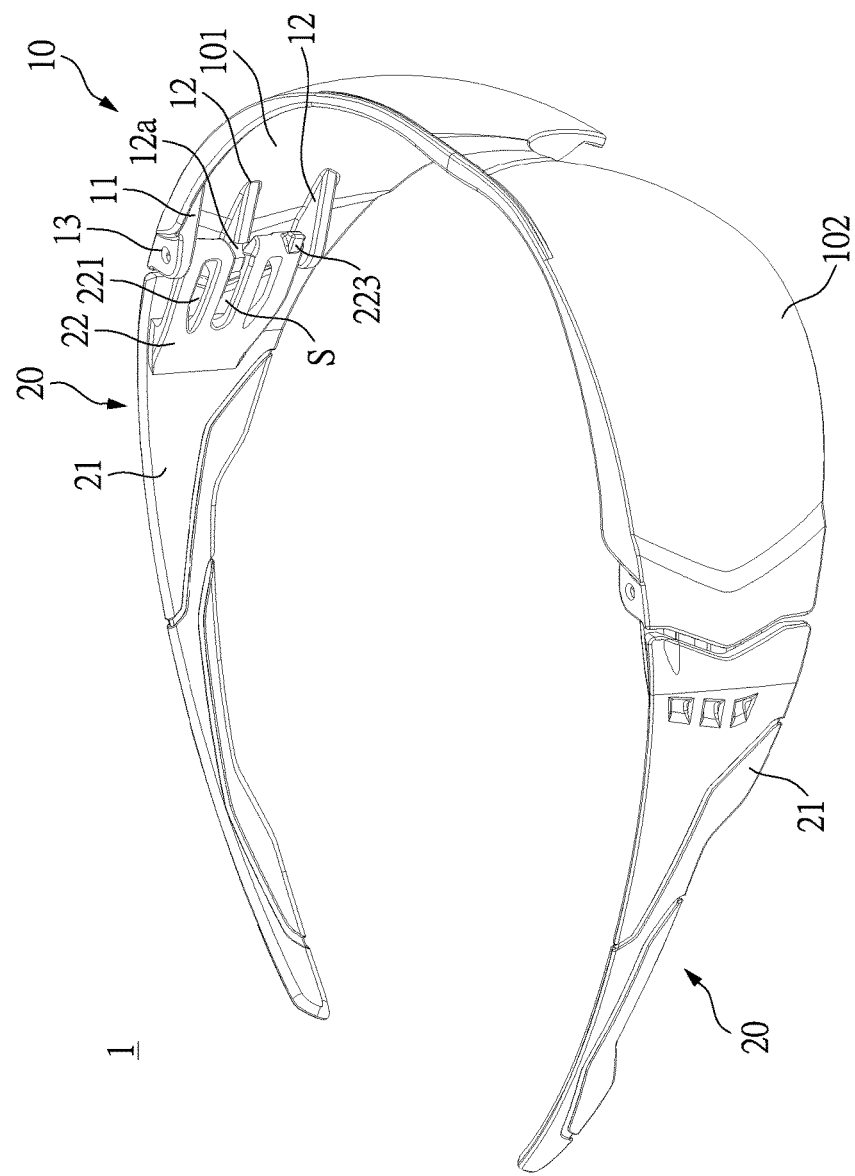
FIG. 1 is a schematic diagram of the first aspect of the eyeglass structure according to the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

Figure 2:
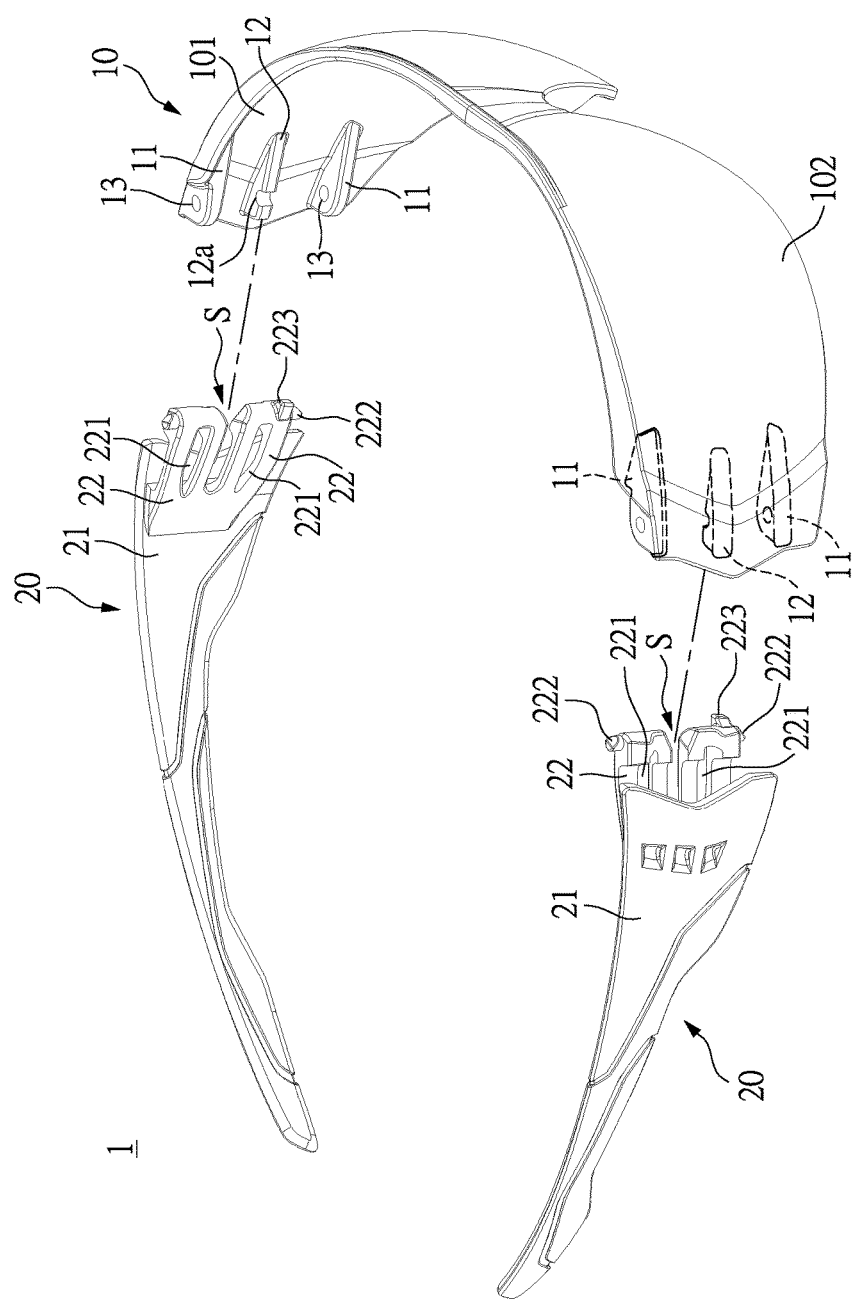
FIG. 2 is an exploded view of the eyeglass structure according to the present disclosure.
Figure 9:
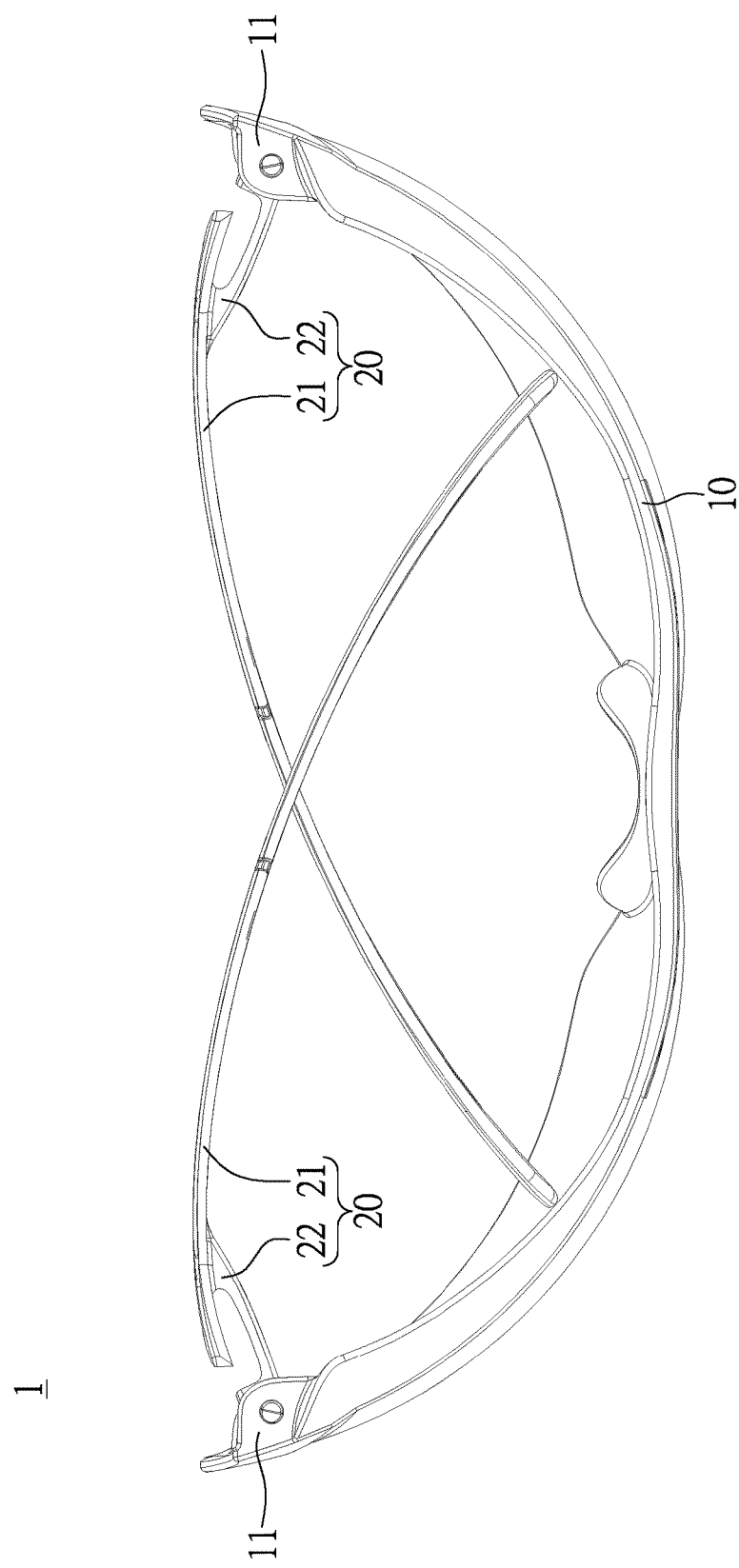
FIG. 9 is a top view of the second aspect of the eyeglass structure according to the present disclosure.
Figure 10:
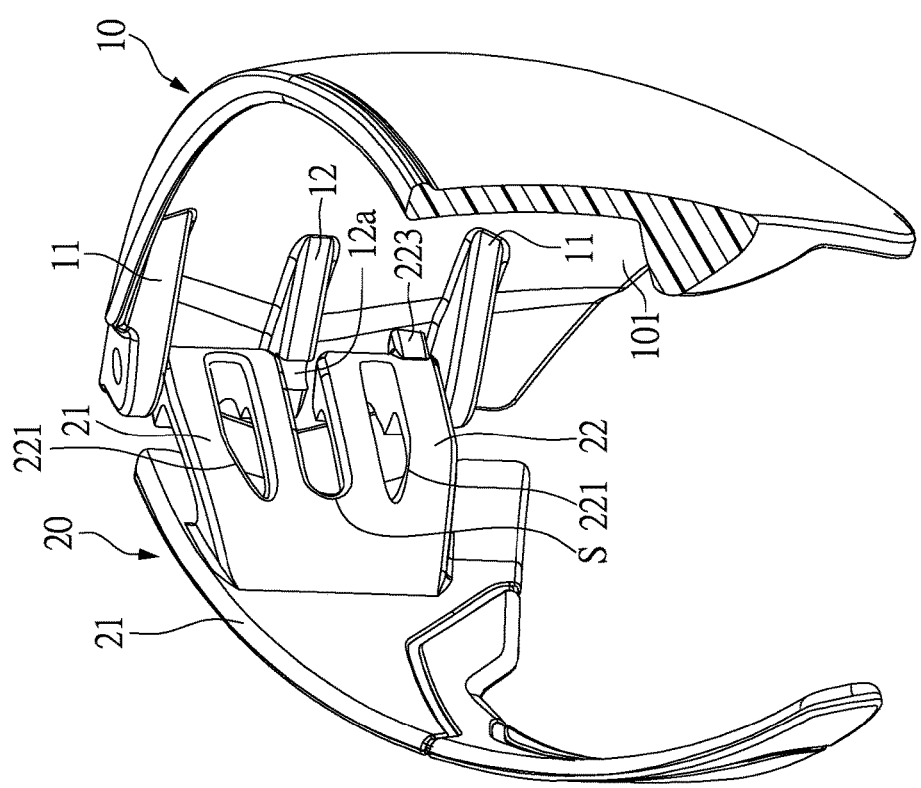
FIG. 10 and FIG. 11 are the schematic diagrams of the second aspect of the eyeglass structure according to the present disclosure.
Figure 11:
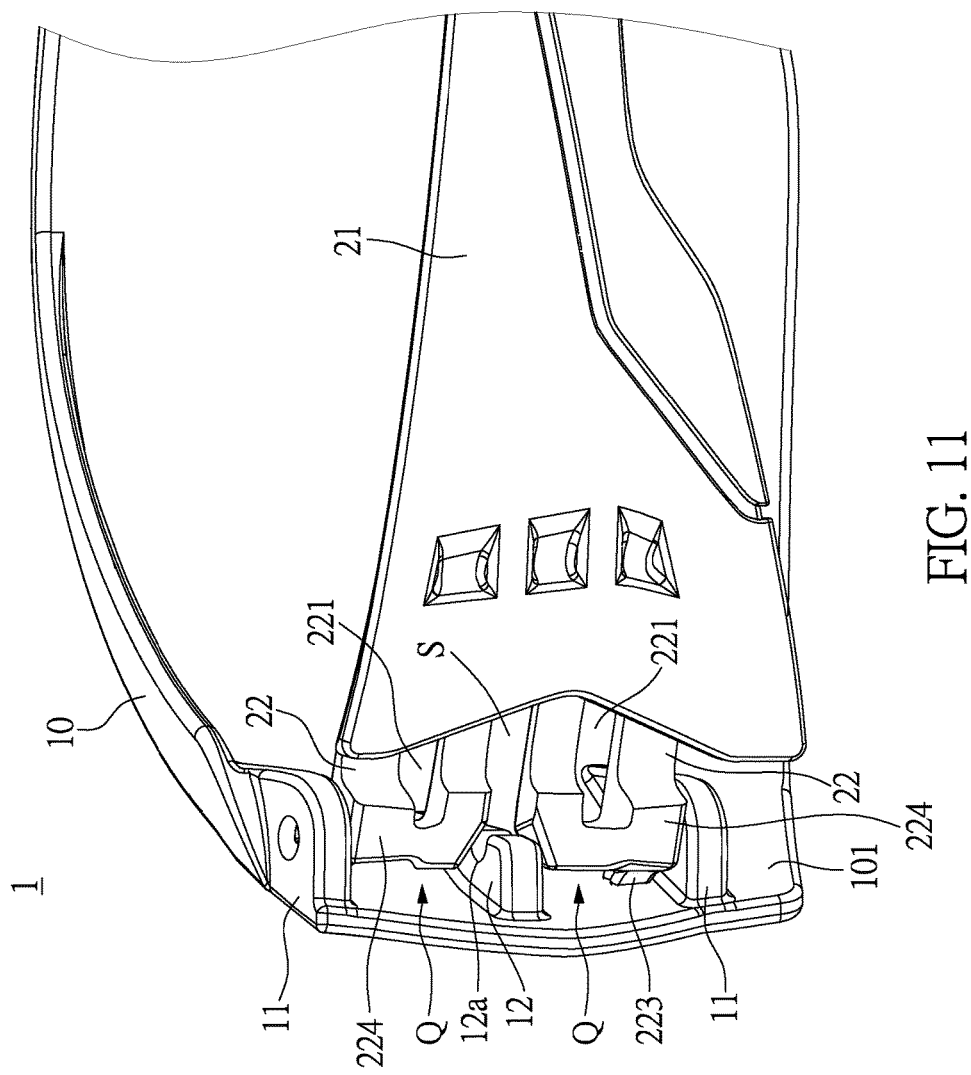

Please refer to FIG. 1 and FIG. 2. An eyeglass structure 1 includes a lens 10 and a pair of temples 20. Each of the temples 20 is pivotally connected to one end of the lens 10. Here, FIG. 1 is a schematic diagram of the first aspect of the eyeglass structure according to the present disclosure, and FIGS. 9-11 are the schematic diagrams of the second aspect of the eyeglass structure according to the present disclosure, wherein the first aspect illustrates that the pair of temples 20 pivot between an open position perpendicular with the lens 10, thereby enabling the user to wear the eyeglass structure, and the second aspect illustrates that the pair of temples 20 are in a closed position parallel with the lens 10.

Figure 3:
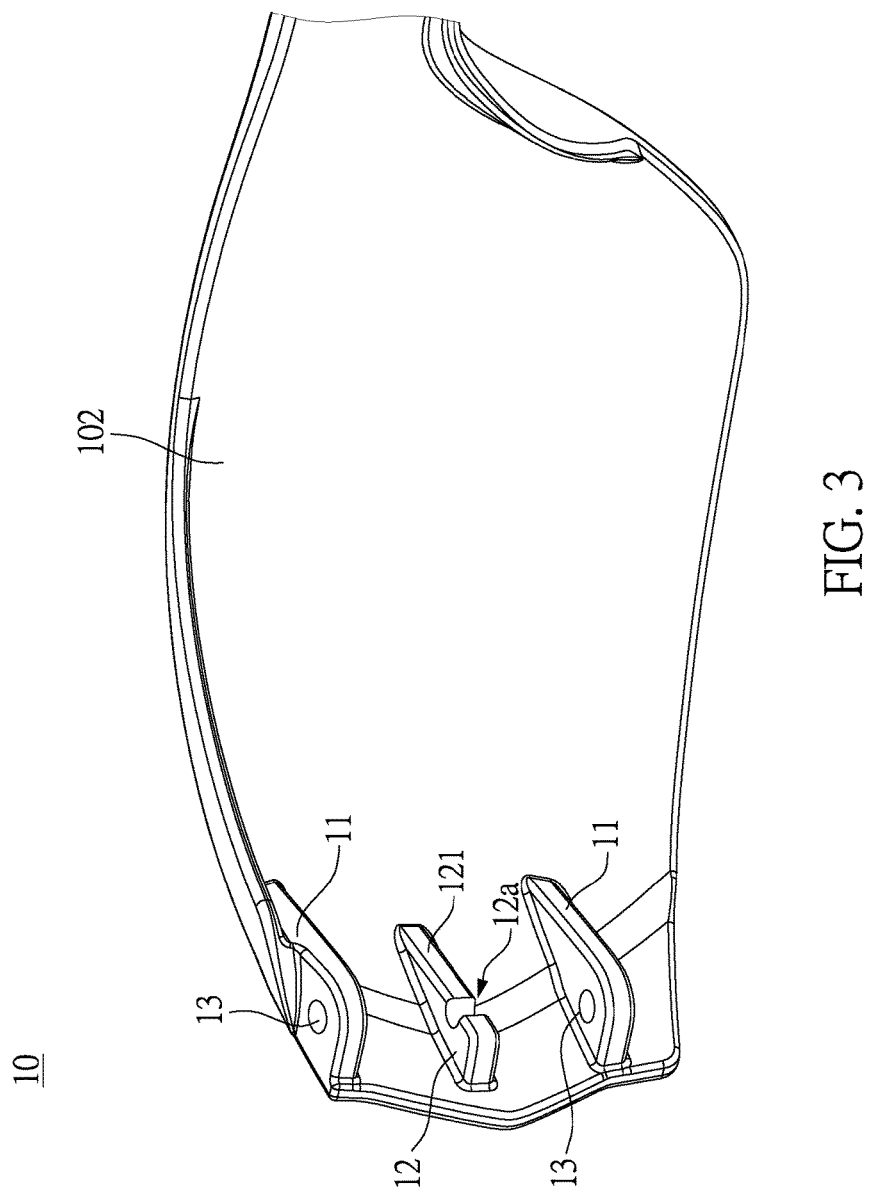
FIG. 3 is a schematic diagram illustrating one end of the lens of the eyeglass structure according to the present disclosure.

Please refer to FIG. 1, FIG. 2, and FIG. 3 together. Two side surfaces of the lens 10 are respectively defined as an internal side surface 101 and an external side surface 102. Two ends of the internal side surface 101 of the lens 10 are respectively disposed with a pair of connecting parts 11 and a position limiting part 12, wherein the position limiting part 12 and the pair of connecting parts 11 are disposed at intervals. Each of the connecting parts 11 has a pivot hole 13, and each of the position limiting parts 12 has a concave part 12a. The concave part 12a is close to a central portion of the position limiting part 12 and formed inwardly from a top surface 121 of the position limiting part 12. In addition, the concave part 12a can be made according to an end of a side surface of a connecting arm 22.

In practice, the intervals between the position limiting part 12 and the pair of connecting parts 11 are substantially the same, and the pair of connecting parts 11 and the position limiting part 12 disposed on each of the temples 20 are integrally formed. Each of the connecting parts 11 and the position limiting parts 12 can be made according to the actual requirements, but the present disclosure is not limited thereto. In addition, the pivot hole 13 can be a penetration hole, but is not limited thereto. In a preferred embodiment, the pivot hole 13 and the concave part 12*a* disposed on each end of the lens 10 can be formed on the same axle line.

Figure 4:
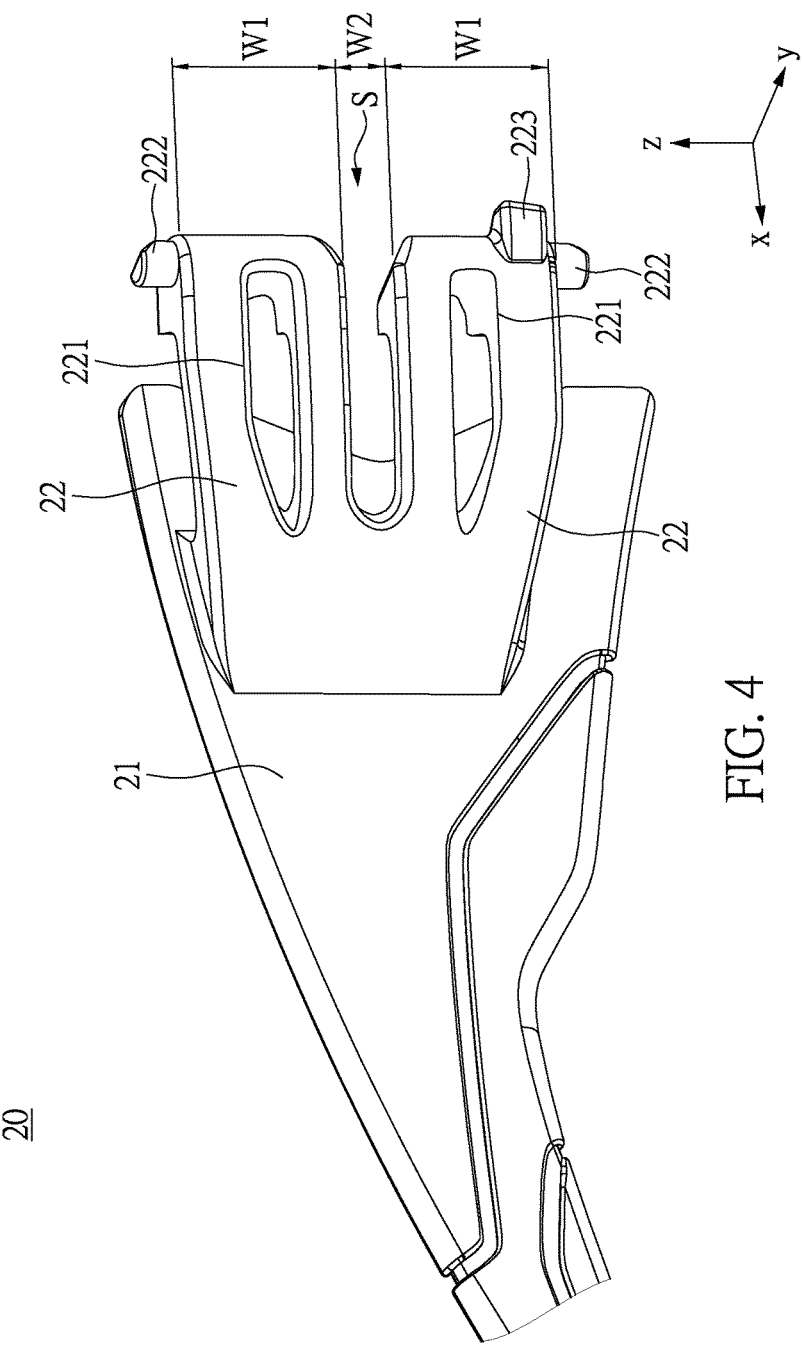
FIG. 4 and FIG. 5 are the schematic diagrams illustrating one end of the temple of the eyeglass structure according to the present disclosure.
Figure 5:
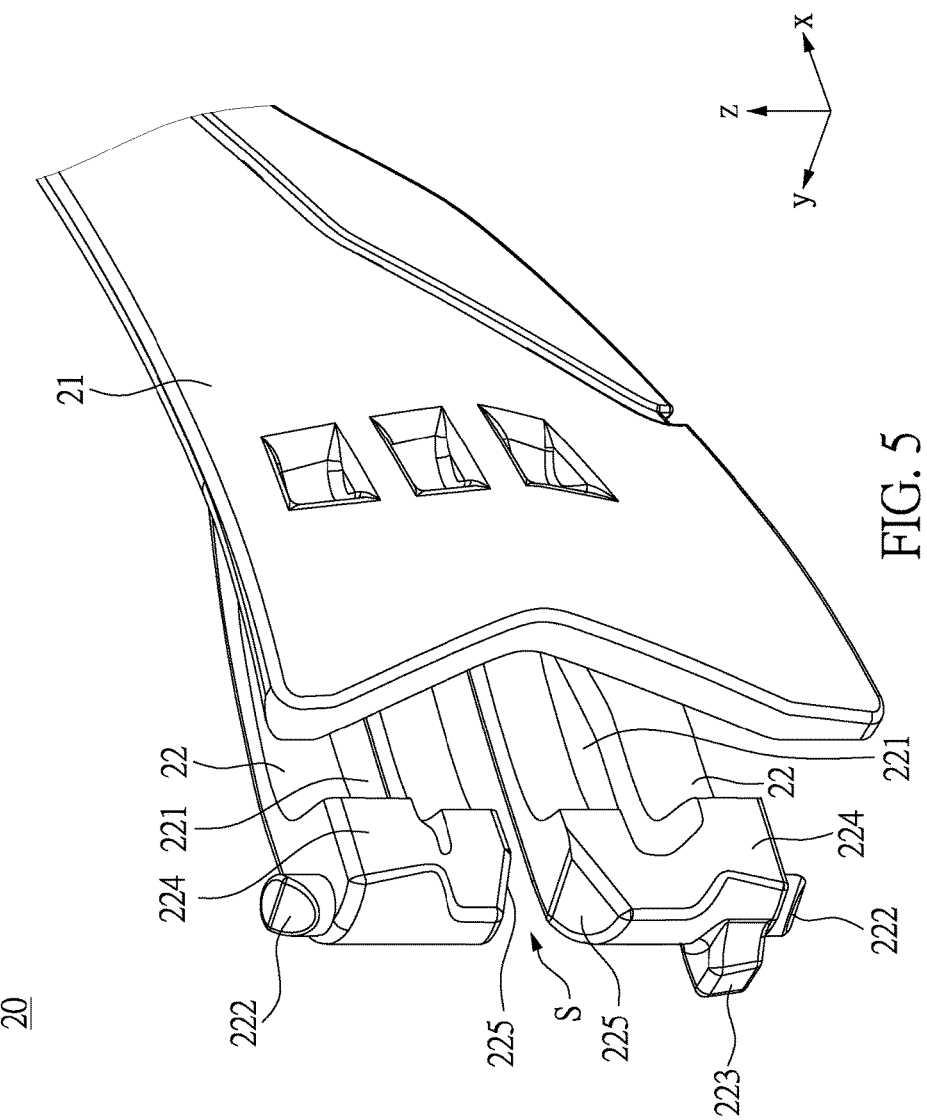

Please refer to FIG. 4 and FIG. 5 together. The pair of temples 20 respectively includes a main body 21 and a pair of connecting arms 22. Each of the connecting arms 22 is connected to an internal side of the main body 21, and corresponds to one end of the temple 20. A space S is formed between the pair of connecting arms 22, and each of the connecting arms 22 is a flexible structure. In addition, each of the connecting arms 22 has a hollow part 221 used to increase the elastic force of the connecting arm 22 and decrease the total weight of the eyeglass structure 1.

In a preferred embodiment, the pair of connecting arms 22 disposed on each of the temples 20 can be a sheet-like structure, and connected to an internal side of the main body 21. As shown in FIG. 1 and FIG. 2, the main body 21 covers a part of the pair of connecting arms 22 and the hollow part 221 thereof. Thus, when each of the temples 20 is pivotally connected to the lens 10, most of the pair of connecting arms 22 disposed on each of the temples 20 is not exposed, being covered by the main body 21, so that the pair of connecting arms 22 are protected. In addition, the pair of connecting arms 22 which are formed integrally to be a sheet-like structure can reinforce the strength of the eyeglass structure 1 and are easily manufactured.

Figure 8:
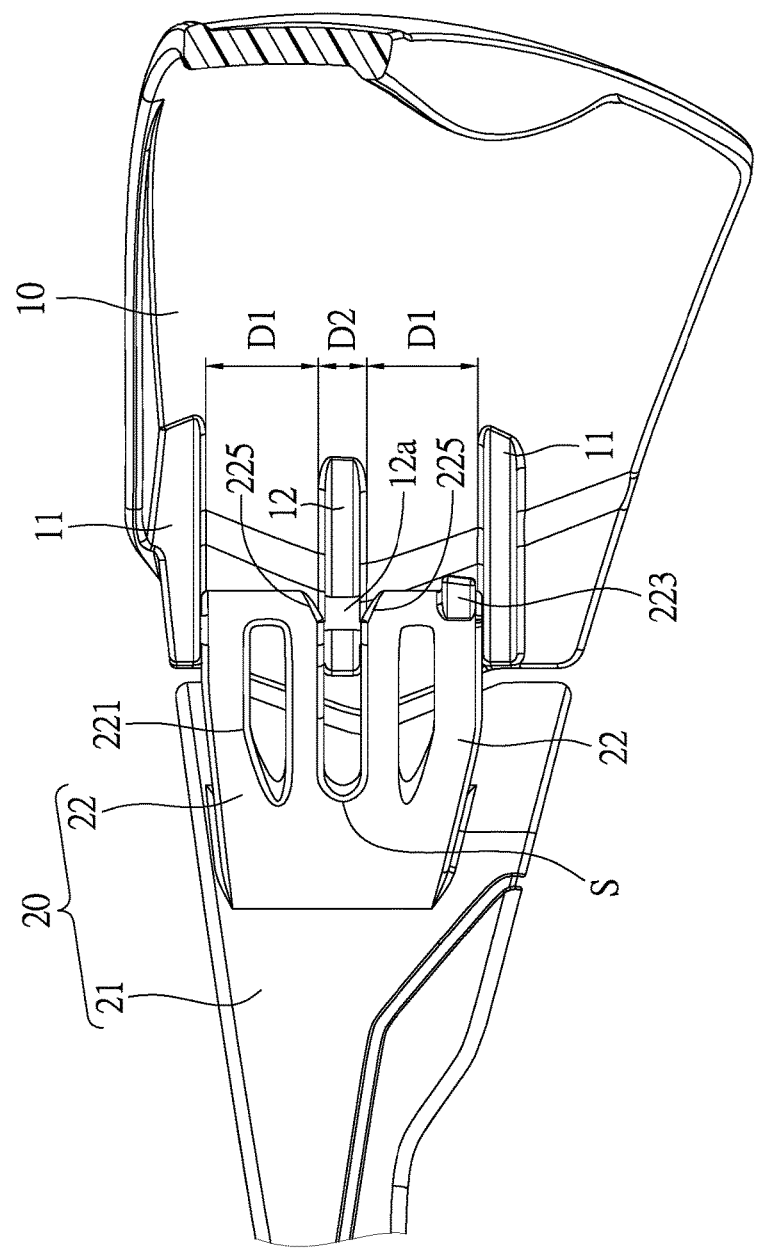
FIG. 8 is a plan view of the first aspect of the eyeglass structure according to the present disclosure.

Please refer to FIG. 4 and FIG. 8 together. As shown in FIG. 4, each of the connecting arms 22 disposed on each of the temples 20 has a width W1, and each width W1 is substantially the same. As shown in FIG. 8, each of the pair of connecting parts 11 on the lens 10 and the position limiting part 12 has a distance D1 therebetween, and each D1 is substantially the same. Each width W1 is substantially equal to or bigger than each distance D1. Please return to FIG. 4. The space S between the pair of connecting arms 22 disposed on each of the temples 20 has a width W2. Please refer to FIG. 8. Each position limiting part 12 disposed on the lens 10 has a width D2, and each D2 is substantially the same. Each width W2 is substantially equal to or bigger than each width D2. In other words, each width D2 is smaller than each width W2. Thus, when the pair of temples 20 are pivotally connected to two ends of the lens 10 respectively, the pair of connecting arms 22 disposed on each of the temples 20 are respectively received in the spaces between the position limiting part 12 and the pair of connecting parts 11, and the position limiting part 12 is selectively received in the space S between the pair of connecting arms 22.

One end of each of connecting arms 22 is disposed with a protrusion portion 222, wherein a pair of protrusion portions 222 disposed on the pair of connecting arms 22 are opposite to each other. The pair of connecting arms 22 can be pivotally connected to a pair of pivot holes 13 disposed on the pair of connecting parts 11 by their respective protrusion portions 222. In a preferred embodiment, the protrusion portion 222 can be a protrusion structure, a penetration hole, or a concave hole, and the pivot hole 13 can be a convex part corresponding to the protrusion portion 222, but the present disclosure is not limited thereto.

It has to be addressed that one end of one of the connecting arms 22 which is relative to the main body 21 is disposed with a stopper 223 used to stop the lens 10 when the pair of temples 20 are in a closed position parallel with the lens 10. In practice, each of the temples 20 can be disposed with two stoppers 223 which are respectively disposed at one end of each of the connecting arms 22. The stopper 223 can be made according to the actual requirements, and is not limited thereto.

As shown in FIG. 5, the pair of connecting arms 22 disposed on each of the temples 20 which face an internal side surface of the main body 21 are respectively disposed with a position stopper 224 used to stop the internal side surface 101 of the lens 10 when the pair of temples 20 pivot between an open position perpendicular with the lens 10 (as show in FIG. 1), thereby limiting an angle with respect to the pair of temples 20 respectively being rotated relative to the lens 10. In practice, the position stopper 224 can be made according to the internal side surface 101 of the lens 10, but is not limited thereto.

Figure 6:
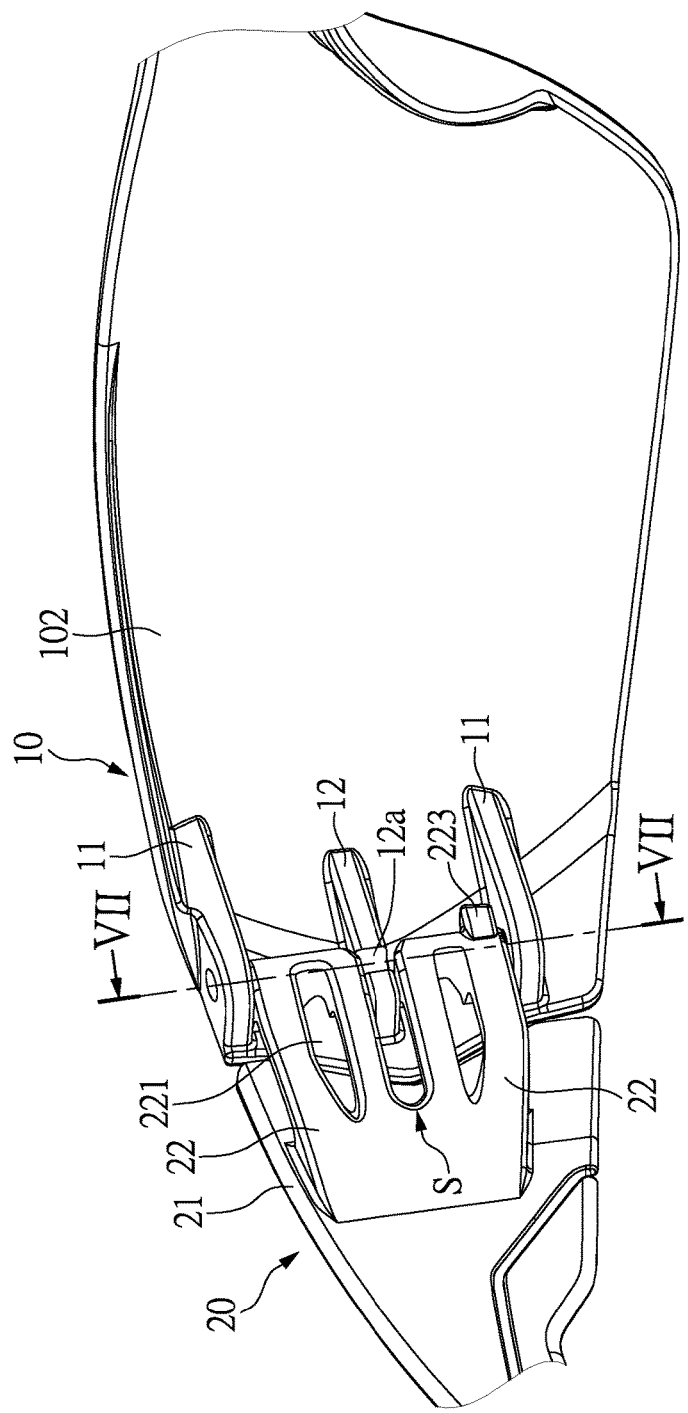
FIG. 6 is a schematic diagram of illustrating a part of the first aspect of the eyeglass structure according to the present disclosure.
Figure 7:
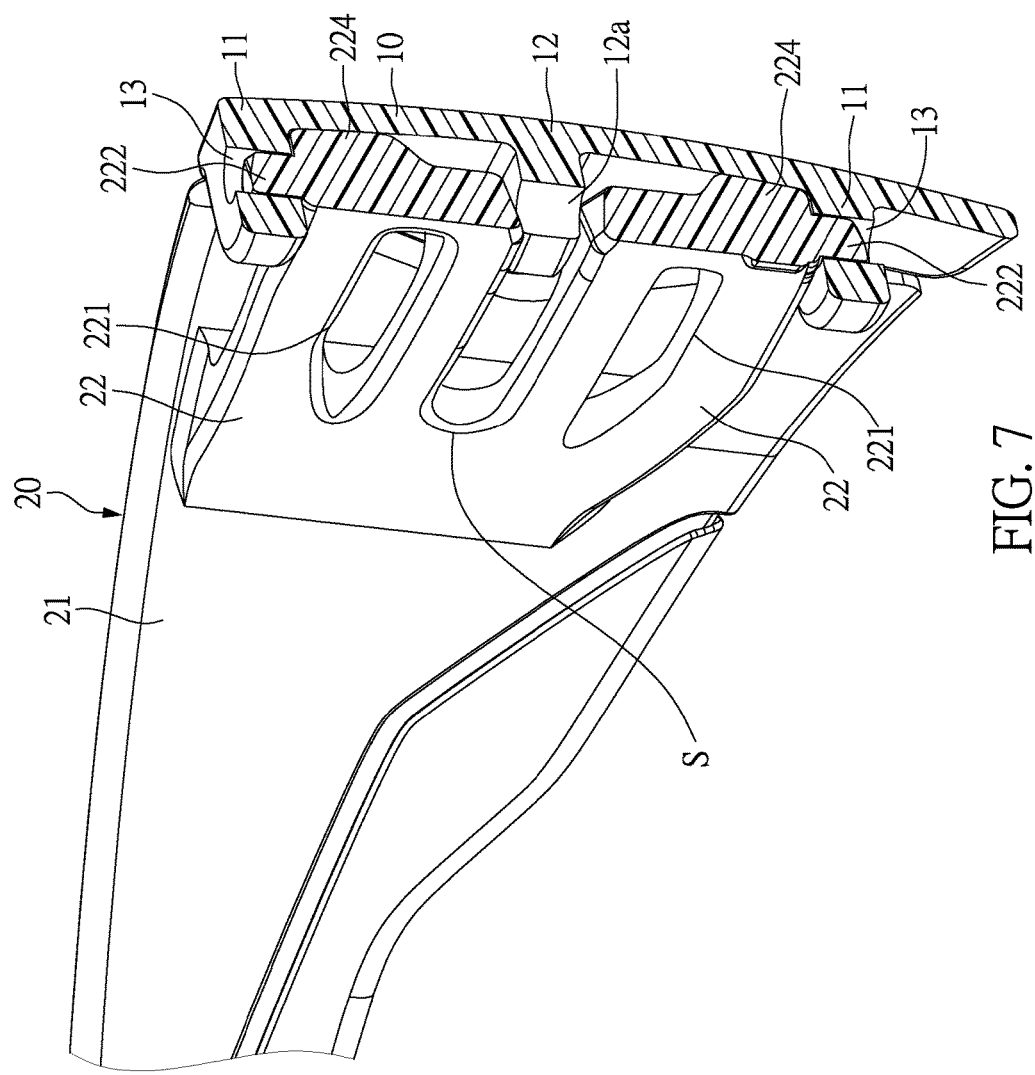
FIG. 7 is a sectional view of the section line VII-VII according to FIG. 6.

Please refer to FIG. 6, FIG. 7 and FIG. 8 together. When the pair of temples 20 pivot between an open position perpendicular with the lens 10, the pair of connecting arms 22 disposed on each of the temples respectively correspond to the spaces between the position limiting part 12 and the pair of connecting parts 11, the position limiting part 12 corresponds to the space S between the pair of connecting arms 22, and the position stopper 224 of each of the connecting arms 22 stops the internal side surface 101 of the lens 10. Because of the relationship between the pair of connecting arms 22 and the position limiting part 12, the pair of temples 20 can be flexibly rotated to close relative to the lens 10 respectively, thereby increasing the stability of the pair of temples 20. In addition, because the position stopper 224 of the connecting arm 22 disposed on each of the temples 20 can stop the internal side surface 101 of the lens 10, an angle with respect to the pair of temples 20 respectively being rotated relative to the lens 10 can be limited effectively, so that the pair of temples 20 is protected from being overly rotated relative to the lens 10 suffering damage.

Please refer to FIG. 9, FIG. 10 and FIG. 11 together. As shown in the figures, when the temple 20 is rotated to the internal side surface 101 of the lens 10, the stopper 223 of the connecting arm 22 disposed on each of the temples 20 can stop the internal side surface 101 of the lens 10 to avoid the temple 20 overly rotating to the internal side surface 101 of the lens 10, thereby protecting the lens 10 from being damaged by the temple 20 and protecting the pivot hole 13 between the temple 20 and the lens 10. When the stopper 223 stops the internal side surface 101 of the lens 10, ends of the pair of connecting arms 22 which are relative to the main body 21 respectively correspond to two sides of the concave part 12*a* of the position limiting part 12. Thus, the user can press the other side of each of the connecting arms 22 to enable the pair of connecting arms 22 to move to and then to enter the concave part 12*a* to separate the pair of connecting arms 22 from the pair of pivot holes 13 disposed on the pair of connecting parts 11, allowing the user to easily detach the temples 20 from the lens 10.

Figure 12:
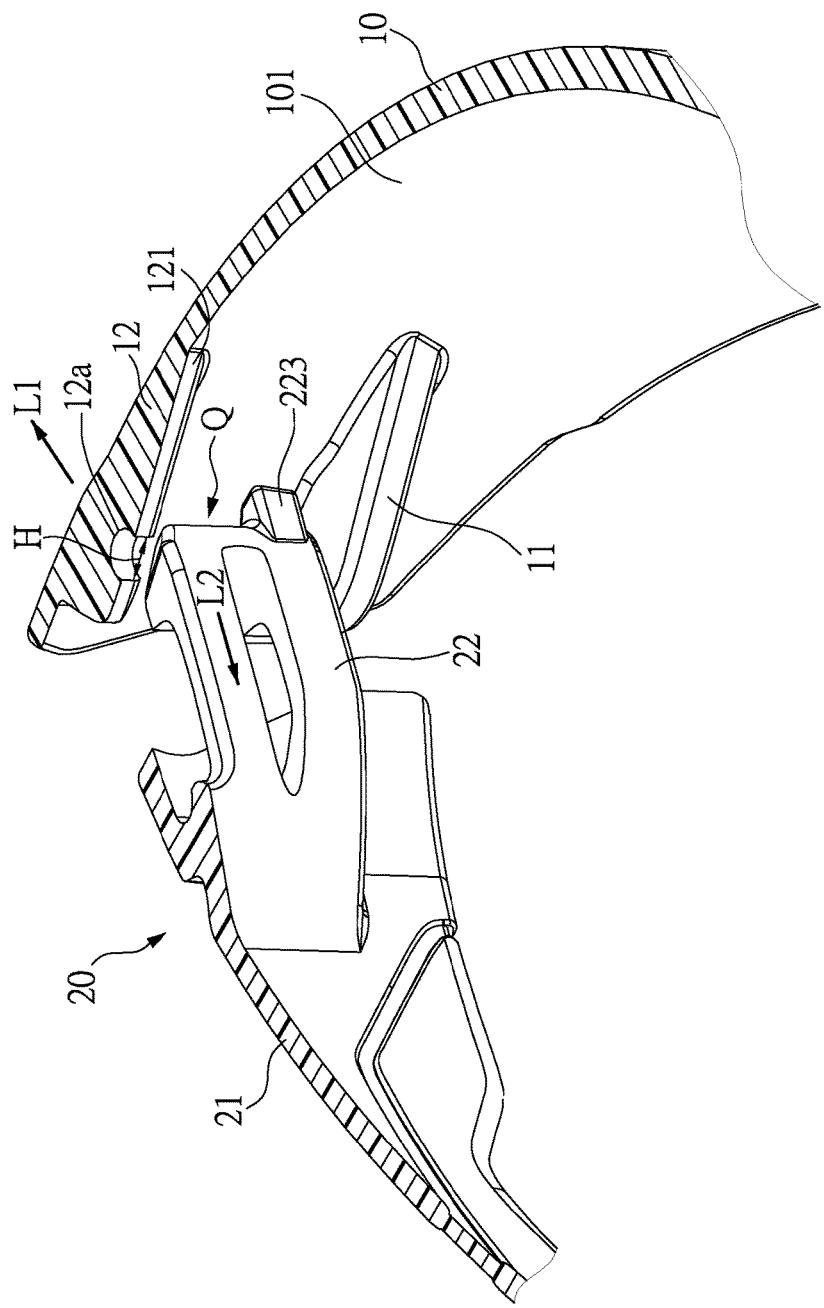
FIG. 12 is an exploded view illustrating a part of the eyeglass structure according to the present disclosure.

Please refer to FIG. 11 and FIG. 12 together. The top surface 121 of the position limiting part 12 which is relative to the internal side face 101 of the lens 10 has the concave part 12*a* formed inwardly along an axial direction L1, and a thickness of each of the connecting arms 22 adjacent to the concave part 12*a* is smaller than a width H of the concave part 12*a*.

When the user rotates the temple 20 relative to the lens 10 and the stopper 223 stops the internal side surface 101 of the lens 10, a major axis direction L2 of the pair of connecting arms 22 is parallel to the axial direction L1, between the end of each of the connecting arms 22 and the internal side surface 101 of the lens 10 exists a gap Q, and the end of each of the connecting arms 22 substantially corresponds to a bottom of the concave part 12a. Thus, when the user presses an external side of each of the connecting arms 22, the end of each of the connecting arms 22 enters the concave part 12a to separate the pair of connecting arms 22 from the pair of connecting parts 11, allowing the user to detach the temple 20 from the lens 10.

In practice, in order to enable the pair of connecting arms 22 to enter the concave part 12a easily, ends of the pair of connecting arms 22 which are adjacent to the concave part 12a are respectively disposed with an inclined portion 225. As shown in FIG. 8, when being pressed by an external force, the pair of connecting arms 22 can be guided into the concave part 12a correctly through the inclined portions 225 even though the pair of connecting arms 22 do not accurately correspond to the concave part 12a or the point of force is inadequate. That is, the inclined portion 225 enables the user to detach the temple 20 from the lens 10 correctly despite the pair of connecting arms 22 not corresponding to the concave part 12a accurately.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. An eyeglass structure, comprising:
a lens of which two side surfaces defined as an internal side surface and an external side surface, two ends of the internal side surface of the lens respectively disposed with a pair of connecting parts and a position limiting part, wherein the position limiting part and the pair of connecting parts are disposed at intervals, each of the connecting parts disposed with a pivot hole, and each of the position limiting parts disposed with a concave part;
a pair of temples each respectively pivotally connected to one end of the lens, and a space formed between the pair of the connecting arms, wherein a pair of protrusion portions disposed on the pair of the connecting arms are opposite to each other, the pair of the connecting arms respectively received in spaces between the position limiting part and the pair of the connecting parts, and at least one part of the position limiting part selectively received in the space between the pair of the connecting arms; and
wherein a part of the pair of connecting arms disposed on each of the temples selectively moves to the concave part to enable the pair of connecting arms to separate from the pair of the connecting parts.

2. The eyeglass structure according to claim 1, wherein the pair of pivot holes and the concave part disposed at each end of the lens are on the same axle line.

3. The eyeglass structure according to claim 1, wherein one of the connecting arms disposed on each of the temples is disposed with a stopper; when each of the temples is rotated to the internal side surface of the lens and the stopper stops the internal side surface of the lens, a part of the pair of connecting arms moves to the concave part by pressing an external force, thereby separating the pair of connecting arms from the pair of connecting parts.

4. The eyeglass structure according to claim 1, wherein one side of each of the connecting arms which faces the internal surface of the lens is disposed with a position stopper used to selectively stop the internal side surface of the lens, thereby limiting an angle with respect to the temple being rotated relative to the lens.

5. The eyeglass structure according to claim 1, wherein each of the connecting arms is disposed with a hollow part used to increase an elastic force of each of the connecting arms.

6. The eyeglass structure according to claim 1, wherein one end of each of the connecting arms adjacent to the concave part is disposed with an inclined portion.

7. The eyeglass structure according to claim 1, wherein a width of each of the concave parts is bigger than a thickness of each of the connecting arm adjacent to the concave part.

8. The eyeglass structure according to claim 1, wherein each of the temples has a main body, the pair of connecting arms are connected to one side surface of main body, and a part of the pair of connecting arms is covered by the main body.

9. The eyeglass structure according to claim 1, wherein each of the position limiting parts has a concave part, and each concave part is formed inwardly in the central portion of the position limiting part and along an axle line perpendicular to the internal side surface; when a major axis direction of the pair of the connecting arms is parallel to the axial direction, the pair of connecting arms move to and then enter the concave part so as to separate the pair of connecting arms from the pair of connecting parts.

10. The eyeglass structure according to claim 9, wherein when the stopper of each of the connecting arms stops the internal side surface of the lens, between one end of each of the connecting arms and the internal side surface of the lens has a gap, and the end of each of the connecting arms corresponds a bottom of the concave part.

* * * * *